United States Patent
Son et al.

(10) Patent No.: US 8,321,760 B2
(45) Date of Patent: Nov. 27, 2012

(54) SEMICONDUCTOR MEMORY DEVICE AND DATA PROCESSING METHOD THEREOF

(75) Inventors: Hong Rak Son, Anyang-si (KR); Junjin Kong, Yongin-si (KR); Jaehong Kim, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 382 days.

(21) Appl. No.: 12/702,353

(22) Filed: Feb. 9, 2010

(65) Prior Publication Data

US 2010/0223530 A1    Sep. 2, 2010

(30) Foreign Application Priority Data

Feb. 27, 2009    (KR) .................. 10-2009-0016868

(51) Int. Cl.
*G11C 29/00* (2006.01)
(52) U.S. Cl. ...................... 714/763; 711/103
(58) Field of Classification Search .................. 714/763; 711/103

See application file for complete search history.

(56) References Cited

U.S. PATENT DOCUMENTS

| 4,993,029 | A | | 2/1991 | Galbraith et al. |
| 5,627,935 | A | * | 5/1997 | Kim ........................ 386/263 |
| 6,041,001 | A | * | 3/2000 | Estakhri ................... 365/200 |
| 7,224,296 | B2 | | 5/2007 | Coene et al. |
| 7,849,383 | B2 | * | 12/2010 | Lin .......................... 714/763 |
| 2007/0300130 | A1 | * | 12/2007 | Gorobets ................. 714/766 |
| 2009/0323942 | A1 | * | 12/2009 | Sharon et al. ............. 380/44 |
| 2010/0070686 | A1 | * | 3/2010 | Mergler et al. ........... 711/103 |
| 2011/0060969 | A1 | * | 3/2011 | Ramamoorthy et al. .. 714/773 |

FOREIGN PATENT DOCUMENTS

| JP | 10-334609 | | 12/1998 |
| JP | 2005-523601 | | 8/2005 |
| KR | 1020040102106 | A | 12/2004 |
| WO | 03/088501 | A3 | 10/2003 |

* cited by examiner

*Primary Examiner* — Sam Rizk
(74) *Attorney, Agent, or Firm* — Volentine & Whitt, PLLC (57) ABSTRACT

Provided are a semiconductor memory device and a data processing method thereof. The semiconductor memory device includes a nonvolatile memory and a memory controller. The nonvolatile memory stores data a plurality of memory cells. The memory controller rearranges data by various operations such as a modulation code operation and processes the data according to an ECC operation to reduce the interference between the memory cells.

18 Claims, 12 Drawing Sheets

| | MC1 | MC2 | MC3 | MC4 | MC5 | MC6 | MC7 | MC8 | MC9 |
|---|---|---|---|---|---|---|---|---|---|
| LSB | 1 | 0 | 0 | 1 | 1 | 0 | 0 | 1 | 0 |
| MSB | 1 | 1 | 1 | 1 | 1 | 1 | 1 | 0 | 0 |
| State | E0 | P3 | P3 | E0 | E0 | P3 | P3 | P1 | P2 |

210, 220, 230, 240

(b) (d=1, k=∞)

| Input Data | Coded Data |
|---|---|
| 000 | 00000 |
| 001 | 00001 |
| 010 | 00010 |
| 011 | 00100 |
| 100 | 00101 |
| 101 | 01000 |
| 110 | 01001 |
| 111 | 01010 |

(c)

| | MC1 | MC2 | MC3 | MC4 | MC5 | MC6 | MC7 | MC8 | MC9 | MC10 | MC11 | MC12 | MC13 | MC14 | MC15 |
|---|---|---|---|---|---|---|---|---|---|---|---|---|---|---|---|
| LSB | 1 | 0 | 0 | 1 | 1 | 0 | 0 | 1 | 0 | x | x | x | x | x | x |
| MSB | 0 | 1 | 0 | 1 | 0 | 0 | 1 | 0 | 1 | 0 | 0 | 0 | 1 | 0 | 1 |
| State | P1 | P3 | P2 | E0 | P1 | P2 | P3 | P1 | P3 | x | x | x | x | x | x |

SEMICONDUCTOR MEMORY DEVICE AND DATA PROCESSING METHOD THEREOF

CROSS-REFERENCE TO RELATED APPLICATIONS

A claim of priority under 35 U.S.C. §119 is made to Korean Patent Application No. 10-2009-0016868, filed on Feb. 27, 2009, the entirety of which is hereby incorporated by reference.

BACKGROUND

The inventive concepts described herein are generally related to electronic devices, and more particularly, to a semiconductor memory device and a data processing method thereof.

Semiconductor memory devices are microelectronic devices that are most necessary to design digital logic circuits such as microprocessor-based applications and computers for the fields ranging from satellite to consumer electronics. Therefore, an advance in memory fabrication technology, including technology development and process improvement obtained through scaling for high speed and high integration density, assists in establishing the performance standards of other digital logic systems.

Semiconductor memory devices are generally classified into volatile memory devices and nonvolatile memory devices. Nonvolatile memory devices can retain data even when power supply is interrupted. Data stored in nonvolatile memory devices may be permanent or reprogrammable according to memory fabrication technologies. Nonvolatile memory devices are used to store data or program codes in various applications such as computers, avionics, communications, and consumer electronic technologies.

A typical example of a nonvolatile memory device is a flash memory device. Recently, as the demand for high integration of memory devices increases, multi-bit memory devices capable of storing multi-bit data in each memory cell are being universalized. Memory cells of a multi-bit flash memory device must be controlled to have a small interval between threshold voltage distributions. That is, data retention characteristics are the most important factors in relation to the reliability of data. However, the threshold voltage of a memory cell may shift due to various factors. The electric charges (or electrons) stored in a floating gate may leak due to various fail mechanisms such as thermionic emission, charge diffusion, ionic impurity, and program disturbance stress that are caused by defects of a dielectric layer. This may cause a shift of the threshold voltage. In the state where a control gate of the memory cell maintains a predetermined voltage (e.g., a power supply voltage or a read voltage), when the floating gate gradually acquires electric charges, a charge acquisition effect may occur due to read disturbance. This may cause an increase in the threshold voltage. Due to the above various factors, the threshold voltage of memory cells may increase or decrease by state. In particular, lateral charge diffusion (or spreading) is becoming an important problem in a charge trapping flash (CTF) memory device. What is urgently required is a technique to overcome the above problem in multi-bit memory devices that store multi-bit data in each memory cell.

SUMMARY

Exemplary embodiments of the inventive concept are generally related to providing a semiconductor memory device and a data processing method thereof, which can reduce error occurrence probability.

In some embodiments of the inventive concept, semiconductor memory devices include a nonvolatile memory storing data in a plurality of memory cells; and a memory controller rearranging data by various operations such as a modulation code operation, and processing the data according to an ECC (error correction code) operation to reduce the interference between the memory cells.

In other embodiments of the inventive concept, data processing methods for a memory system including a nonvolatile memory, include reconfiguring the arrangement of data, which is to be written in the nonvolatile memory, to reduce the interference between memory cells; and adding a parity, which is generated by an ECC operation, to the reconfigured data.

In further embodiments of the inventive concept, data processing methods for a memory system including a nonvolatile memory, include adding a parity, which is generated by an ECC operation, to data to be written in the nonvolatile memory; and reconfiguring the arrangement of the data with the parity to reduce the interference between memory cells, wherein the ECC operation is a non-systematic ECC operation that changes the arrangement of message bits.

In still further embodiments of the inventive concept, memory systems include a nonvolatile memory; a data arrangement processor reconfiguring the arrangement of data, which is to be written in the nonvolatile memory, to reduce the interference between memory cells; and an ECC unit adding an error detection/correction parity to the reconfigured data and providing the resulting data to the nonvolatile memory.

BRIEF DESCRIPTION OF THE DRAWINGS

The accompanying drawings are included to provide a further understanding of the inventive concept, and are incorporated in and constitute a part of this specification. The drawings illustrate exemplary embodiments of the inventive concept and, together with the description, serve to explain principles of the inventive concept, wherein.

DETAILED DESCRIPTION OF THE EMBODIMENTS

Preferred embodiments of the inventive concept will be described below in more detail with reference to the accompanying drawings. The inventive concept may, however, be embodied in different forms and should not be construed as limited to the embodiments set forth herein. Rather, these embodiments are provided so that this disclosure will be thorough and complete, and will fully convey the scope of the inventive concept to those skilled in the art.

It should be construed that the forgoing general illustrations and the following detailed descriptions are exemplified, and additional explanation is provided. Reference numerals are indicated in detail in preferred embodiments of the inventive concept, and their examples are represented in reference drawings. In every possible case, like reference numerals are used to refer to the same or similar elements in the description and drawings.

Below, a flash memory device is used as an example of a nonvolatile memory device for describing the characteristics and functions of the inventive concept. However, those skilled in the art can easily understand other advantages and performances of the inventive concept according to the descriptions. For example, PRAMs, MRAMs, ReRAMs, FRAMs, and NOR flash memories may be used as storage media, and the inventive concept may also be applicable to a memory system that uses different types of memory devices together. Also, a 2-bit multi-level cell (MLC) is used as an example for describing the characteristics of the inventive concept. However, those skilled in the art can easily understand that the inventive concept may also be applicable to multi-bit memory devices that store at least 3-bit data in each memory cell.

The inventive concept may be embodied or applied through other embodiments. Besides, the detailed description may be amended or modified according to viewpoints and applications, without departing from the scope, technical idea and other objects of the inventive concept.

In the following detailed description, a run-length limited (RLL) code or a modulation code will be used as an example of a data arrangement operation of the inventive concept. However, an example of a data arrangement operation of the inventive concept is not limited to an RLL code or a modulation code. Examples of the data arrangement operation include a randomizing operation and an interleaving operation.

Figure 1:
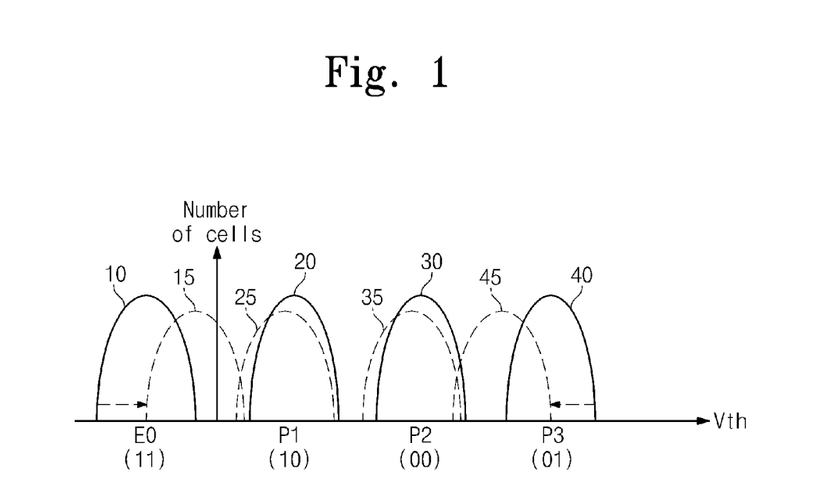
FIG. 1 is a diagram illustrating the threshold voltage distribution of a nonvolatile memory device.

FIG. 1 is a diagram illustrating the threshold voltage distribution of a multi-bit flash memory device. Specifically, FIG. 1 illustrates the threshold voltage distribution of a memory cell storing 2-bit data.

Referring to FIG. 1, an erase state E0 corresponds to 2-bit data '11' and has the lowest threshold voltage level. Also, program states P1, P2 and P3 correspond respectively to 2-bit data '10', '00' and '01'. Herein, the corresponding relationship between the states E0, P1, P2 and P3 and the 2-bit data is merely exemplary. The corresponding relationship between the states E0, P1, P2 and P3 and the 2-bit data may vary depending on the design schemes of the memory device. Although a 2-bit MLC is exemplified for the convenience of description, it will be apparent that the inventive concept is also applicable to at least 3-bit MLCs.

In the flash memory device, adjacent memory cells affect each other when they have different threshold voltages. For example, like program disturbance or lateral charge diffusion, the threshold voltage of a memory cell may increase or decrease according to the threshold voltage of an adjacent memory cell. In particular, the phenomenon of program disturbance or lateral charge diffusion is significant between the memory cell programmed to the erase state E0 and the memory cell programmed to the program state P3 with the highest threshold voltage.

When memory cells are programmed, the threshold voltages of the memory cells form distributions 10, 20, 30 and 40 denoted by solid lines. However, the distribution of the memory cells corresponding to the distribution 10 shifts to a distribution 15 according to the phenomenon of lateral charge diffusion or program disturbance. Also, the distribution of the memory cells corresponding to the distribution 40 shifts to a distribution 45 according to the phenomenon of lateral charge diffusion or program disturbance. The threshold voltage of the memory cells programmed to the erase state E0 increases according to the phenomenon of lateral charge diffusion. Also, the threshold voltage of the memory cells programmed to the program state P3 decreases according to the phenomenon of lateral charge diffusion or program disturbance. In particular, if the erase state E0 with the lowest threshold voltage and the program state P3 with the highest threshold voltage are adjacent to each other, the memory cells are exposed to the largest lateral charge diffusion or program disturbance. Thus, an additional data processing operation is necessary to prevent the condition that the memory cells programmed to the erase state E0 and the program state P3 are adjacent to each other.

Figure 2:
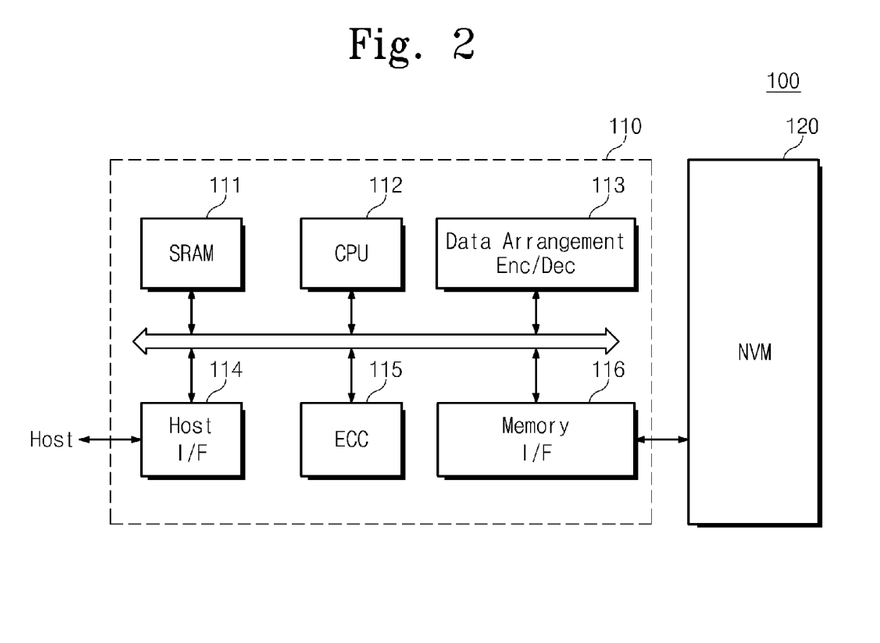
FIG. 2 is a block diagram of a memory system according to an embodiment of the inventive concept.

FIG. 2 is a block diagram of a memory system 100 according to the inventive concept.

Referring to FIG. 2, the memory system 100 includes a nonvolatile memory (NVM) device 120 and a memory controller 110 interfacing between the nonvolatile memory device 120 and a host.

For example, the nonvolatile memory device 120 may be configured using a flash memory device. The memory controller 110 may be configured to control the nonvolatile memory device 120. A combination of the nonvolatile memory device 120 and the memory controller 110 may be provided as a memory card or a solid state disk (SSD).

An SRAM 111 is used as a working memory of a processing unit (CPU) 112. A data arrangement encoder/decoder 113 processes program data to prevent the erase state E0 and the program state P3 from being adjacent to each other in the directions of row and column lines. Also, the data arrangement encoder/decoder 113 decodes read data to recover the original data. The data arrangement encoder/decoder 113 may be configured in hardware, software or firmware.

A host interface 114 has a data exchange protocol of the host connected to the memory system 100. An error correction code (ECC) block 115 detects and corrects an error in data read from the nonvolatile memory device 120. A memory interface (I/F) 116 interfaces with the nonvolatile memory device 120. The processing unit 112 performs control operations for data exchange of the memory controller 110. Although not illustrated in FIG. 2, it will be apparent to those skilled in the art that the memory system 100 may further include a ROM (not illustrated) storing code data for interfacing with the host. The nonvolatile memory device 120 may be provided as a multi-chip package including a plurality of flash memory chips.

The above memory system 100 may be provided as a high-reliability storage medium with a low error occurrence probability. In particular, the flash memory device of the inventive concept may be provided in a memory system such as a solid state disk (SSD) that is under active research and development. In this case, the memory controller 110 may be configured to communicate with an external device (e.g., host) through one of various interface protocols such as USB, MMC, PCI-E, SATA, PATA, SCSI, ESDI, and IDE.

Herein, the memory controller 110 controls the data processing priority with the data arrangement encoder/decoder 113 according to an operation of the ECC block 115. If the ECC block 115 uses a data processing scheme affecting the arrangement of write data, a data arrangement operation may be performed after an error correction operation. However, if an error correction operation does not greatly affect data arrangement, a data arrangement operation of the data arrangement encoder/decoder 113 may be performed before the error correction operation.

The data arrangement encoder/decoder 113 encodes program data, received from the host, according to a data arrangement scheme and provides the resulting data to the nonvolatile memory device 120. The data arrangement encoder/decoder 113 decodes read data, outputted from the nonvolatile memory device 120, and transfers the resulting data to the host. The data arrangement encoder/decoder 113 may be included in the memory controller 110 that interfaces between the nonvolatile memory device 120 and the host. In general, the memory controller 110 is configured to control the nonvolatile memory device 120 to read/write data from/in the nonvolatile memory device 120 in response to a read/write request from the host. The data arrangement encoder/decoder 113 may be configured in hardware, software or firmware and may be included in the memory controller 110. However, the location of the data arrangement encoder/decoder 113 is not limited to the above embodiments.

The nonvolatile memory device 120 stores write data, received from the data arrangement encoder/decoder 113, in a memory cell. In response to a read command from the host, the nonvolatile memory device 120 senses data stored in a cell array and outputs the sensed data as read data. The data arrangement encoder/decoder 113 decodes the read data and transfers the resulting data to the host.

Figure 3:
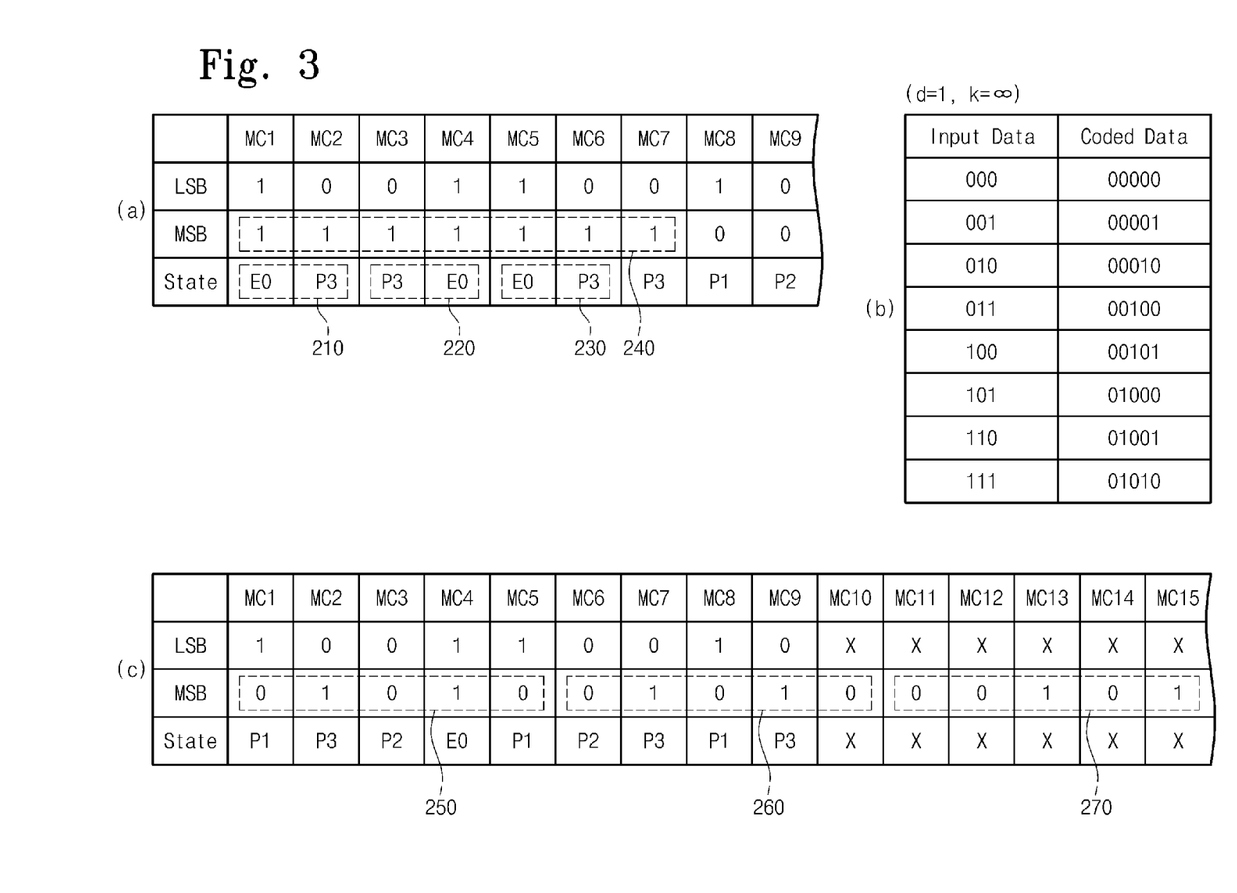
FIG. 3 is a diagram illustrating an example of run-length limited (RLL) coding.

FIG. 3 is a diagram illustrating an example of run-length limited (RLL) coding as an example of data arrangement. An example of RLL coding for data corresponding to one word line or one bit line will be described below with reference to FIG. 3. The use of the above RLL coding makes it possible to prevent the threshold voltage of memory cells, which are adjacent in the direction of a word line or a bit line, from having the erase state E0 and the program state P3.

Referring to FIG. 3, Table (a) briefly shows program data before the performance of RLL coding. Specifically, Table (a) shows some of two page (LSB, MSB) data to be programmed in a word line including 2-bit multi-level cells (MLCs).

It can be seen that memory cells, the erase state E0 and the highest program state P3 of which are adjacent to each other, are paired as MC1-MC2, MC3-MC4 and MC5-MC6. That is, data to be programmed in the memory cell MC1 has the LSB of a logic '1' and the MSB of a logic '1', which corresponds to the erase state E0. Data to be programmed in the memory cell MC2 has the LSB of a logic '0' and the MSB of a logic '1', which corresponds to the program state P3. Thus, the memory cells MC1 and MC2 correspond to a program state condition (E0-P3) 210 requiring RLL coding.

Data to be programmed in the memory cell MC3 has the LSB of a logic '0' and the MSB of a logic '1', which corresponds to the program state P3. Data to be programmed in the memory cell MC4 has the LSB of a logic '1' and the MSB of a logic '1', which corresponds to the erase state E0. Thus, the memory cells MC3 and MC4 correspond to a program state condition (P3-E0) 220 requiring RLL coding.

Data to be programmed in the memory cell MC5 has the LSB of a logic '1' and the MSB of a logic '1', which corresponds to the erase state E0. Data to be programmed in the memory cell MC6 has the LSB of a logic '0' and the MSB of a logic '1', which corresponds to the program state P3. Thus, the memory cells MC5 and MC6 correspond to a program state condition (E0-P3) 230 requiring RLL coding. On the other hand, the memory cells MC7, MC8 and MC9 do not include the program condition of the erase sate E0 adjacent to the program state P3 corresponding to the highest threshold voltage.

The condition that the erase state E0 and the program state P3 are adjacent to each other can be appreciated from Table (a). That is, the MSBs of data corresponding to the erase state E0 and the program state P3 are all a logic '1'. That is, the erase state E0 and the program state P3 are adjacent to each other when the memory cells with an MSB of a logic '1' are adjacent to each other. That is, when the MSBs of data programmed in the adjacent memory cells have a logic '1' successively, the erase state E0 and the program state P3 are adjacent to each other. This MSB condition is denoted by a reference numeral 240.

Accordingly, RLL coding must be performed in such a way that the MSBs of the adjacent memory cells programmed do not have a logic '1' successively, in order to prevent the condition that the erase state E0 and the program state P3 are adjacent to each other.

Table (b) briefly shows a (d, k) code as an example of a binary RLL code, which is configured in such a way that logics '1' are not adjacent to each other. Herein, 'd' denotes the minimum number of logics '0' allowable between two logics '1', and 'k' denotes the maximum number of logics '0' allowable between two logics '1'. Specifically, Table (b) shows an example where an RLL code of 3-bit input and 5-bit output is configured in a lookup table mode under the condition of (d=1, k=∞). If some data of an MSB page to be programmed in memory cells adjacent sequentially to the same word line are '010', the data arrangement encoder/decoder 113 (see FIG. 2) uses an RLL code to output data '00010'. If 3-bit data of the MSB page to be programmed are '111', the data arrangement encoder/decoder 113 applies an RLL code to output data '01010'. An RLL coding scheme of the inventive concept is not limited to the lookup table mode shown in Table (b).

Table (c) shows the results of applying the (d, k) RLL code of Table (b) to the MSB page of the memory cells shown in Table (a). The LSB page is the same as the value before the performance of RLL coding. However, for the MSB page, 3-bit data increases to 5-bit data by RLL coding, so that they sequentially shift to the row-direction memory cells. That is, before the performance of RLL coding, MSB page data to be programmed in the memory cells MC1, MC2 and MC3 is '111'. However, according to RLL coding, the MSB page data '111' is decoded into '01010' (250). Thus, the memory cells MC1, MC2, MC3, MC4 and MC5 are used to program 5-bit data.

Before the performance of RLL coding, MSB page data to be programmed in the memory cells MC4, MC5 and MC6 is also '111'. However, according to RLL coding, the MSB page data '111' is decoded into '01010' (260). Thus, the memory cells MC6, MC7, MC8, MC9 and MC10 are used to program 5-bit data. Before the performance of RLL coding, MSB page data to be programmed in the memory cells MC7, MC8 and MC9 is '100'. However, according to RLL coding, the MSB page data '100' is decoded into '00101' (270). Thus, the memory cells MC11, MC12, MC13, MC14 and MC15 are used to program 5-bit data.

As shown in Table (c), RLL coding is applied to the MSB page, thereby preventing the erase state E0 and the program state P3 from being adjacent between the adjacent memory cells. Although it has been described that RLL coding is applied only to the MSB page, the inventive concept is not limited thereto. That is, RLL coding may be applied to the LSB page. The states of the memory cells MC11, MC12, MC13, MC14 and MC15 are denoted by 'X'. This is because RLL coding is not applied to the LSB data values of the memory cells MC11, MC12, MC13, MC14 and MC15. The memory cell states vary depending on the MSB data values to which RLL coding is not applied.

Although it has been described that RLL coding is applied only to the MSB page, the inventive concept is not limited thereto. Although a coding rate may decrease, RLL coding may be applied to one or both of the LSB/MSB pages.

Figure 4A:
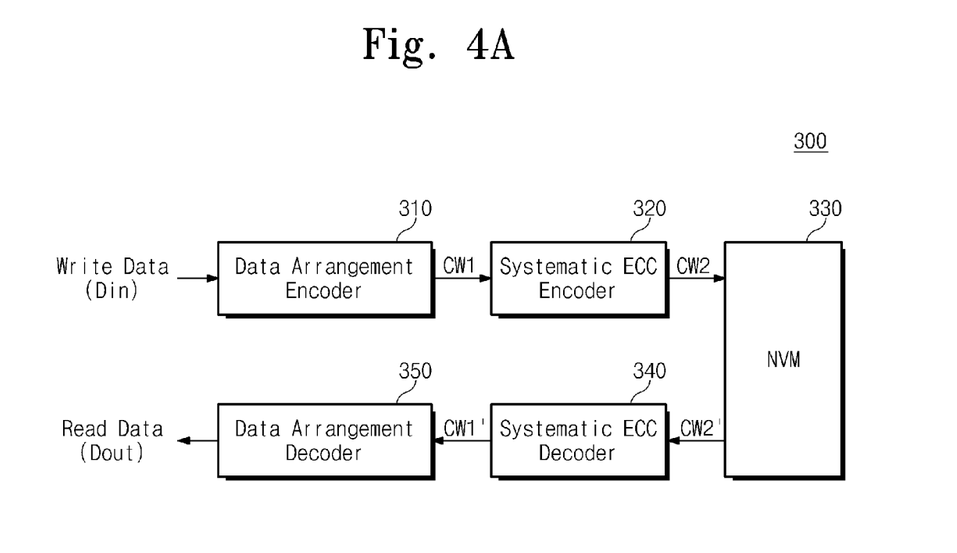
FIGS. 4A and 4B are block diagrams illustrating a data processing procedure of a data arrangement scheme according to an embodiment of the inventive concept.
Figure 4B:
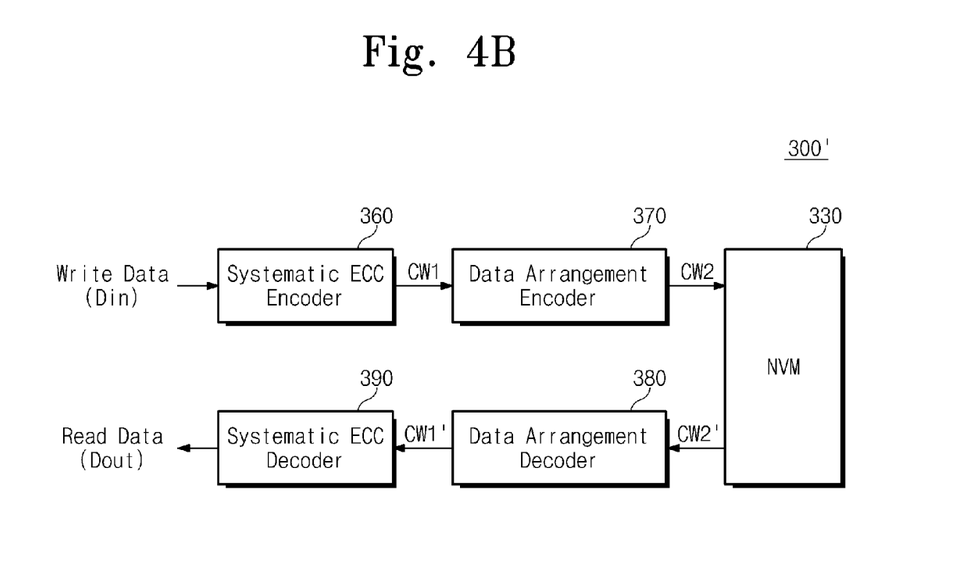

FIGS. 4A and 4B are block diagrams illustrating embodiments of a memory system using a data arrangement scheme according to the inventive concept. A codeword outputted by data arrangement coding (encoding or decoding) becomes different from uncoded data in terms of the arrangement of message bits. Thus, a data processing operation (e.g., error correction) affecting the arrangement of data must be performed in consideration of the sequence with respect to a data arrangement operation. Specifically, FIGS. 4A and 4B illustrate memory systems 300 and 300' using a systematic ECC scheme.

Referring to FIG. 4A, the memory system 300 includes an ECC block that generates a codeword according to a systematic coding scheme. If an input message data matrix is [10101], a codeword processed according to a systematic coding scheme is outputted as [10101|010]. That is, an outputted codeword means a process that maintains the arrangement of message bits '10101' and adds only parity bits '010'. Thus, the arrangement of data processed according to a data arrangement scheme can be maintained by a systematic ECC operation. A detailed description thereof will be made below.

When write data Din is inputted, the data arrangement of the write data Din is changed by a data arrangement encoder 310. For example, the use of RLL coding removes the condition that the erase state E0 and the program state P3 are adjacent to each other after the write data Din is programmed in a memory cell. If the RLL code (d=1, k=∞) encoder of FIG. 3 is applied, when write data Din is data [110], a first write codeword CW1 is outputted as [01001].

A systematic ECC encoder 320 performs a parity generating operation for error detection/correction on the first write codeword CW1 to output a second write codeword CW2. If the systematic ECC encoder 320 performs an encoding operation according to a (n=8, k=5) linear block coding scheme, the second write codeword CW2 is outputted in the form of the addition of 3-bit (n−k=3) parity bits to the first write codeword CW1. For the convenience of description, assume that the second write codeword CW2 outputted by the parity generating operation is [01001|010] if the first write codeword CW1 is [01001]. That is, the bit arrangement of the message bits '01001' is maintained.

The second write codeword CW2 is programmed in a nonvolatile memory device 330. The second write codeword CW2 is data that is substantially removed of the condition that the erase state E0 and the program state P3 are adjacent to each other. Thus, the interference between memory cells can be prevented from occurring due to lateral charge diffusion or program disturbance, which has been described with reference to FIG. 1, even after a programming operation is performed on the nonvolatile memory device 330. Upon receiving a read command from a host, the nonvolatile memory device 330 senses the memory cells programmed with the second write codeword CW2 to output a second read codeword CW2'.

The second read codeword CW2' is provided to a systematic ECC decoder 340. The systematic ECC decoder 340 detects the presence/absence of an error in the second read codeword CW2' and the possibility of error correction. If an error is present in read data, the systematic ECC decoder 340 corrects the error by using parity bits. Through the error detection/correction operation, the systematic ECC decoder 340 outputs a first read codeword CW1' removed of the parity bits. That is, if the second read codeword CW2' is [01001|010], the first read codeword CW1' is outputted as [01001] that has only message bits after being removed of the parity bits '010'.

The data arrangement decoder 350 receives the first read codeword CW1' and performs an inverse operation of the encoding operation performed by the data arrangement encoder 310. For example, if data is decoded according to the RLL coding (d=1, k=∞) scheme, when the first read codeword CW1' is [01001], read data Dout is outputted as [110] by the data arrangement decoder 350.

Referring to FIG. 4B, the memory system 300' includes an ECC block that generates a codeword according to a systematic coding scheme. That is, when write data Din is inputted, a systematic ECC encoder 360 performs an error correction operation on the write data Din. The systematic ECC encoder 360 outputs a first write codeword CW1 with parity bits through a systematic error correction operation. Herein, the message bit arrangement of the first write codeword CW1 is maintained.

A data arrangement encoder 370 receives the first write codeword CW1 and performs a data arrangement encoding operation. For example, the data arrangement encoding operation is performed according the RLL coding scheme described with reference to FIG. 3. By the data arrangement encoding operation, the first write codeword CW1 is outputted as a second write codeword CW2 with a changed data arrangement.

The second write codeword CW2 is programmed in a nonvolatile memory device 330. The second write codeword CW2 is data that is substantially removed of the condition that the erase state E0 and the program state P3 are adjacent to each other. Thus, the interference between memory cells can be prevented from occurring due to lateral charge diffusion or program disturbance, which has been described with reference to FIG. 1, even after a programming operation is performed on the nonvolatile memory device 330.

Upon receiving a read command from a host, the nonvolatile memory device 330 senses the memory cells programmed with the second write codeword CW2 to output a second read codeword CW2'. Thereafter, the second read codeword CW2' is decoded by a data arrangement decoder 380 and a systematic ECC decoder 390 respectively into a first read codeword CW1' and read data Dout.

The memory systems of FIGS. 4A and 4B apply the systematic error correction operation to maintain the message data arrangement. In this case, the data arrangement coding operation may be performed before or after the error correction operation.

Figure 5:
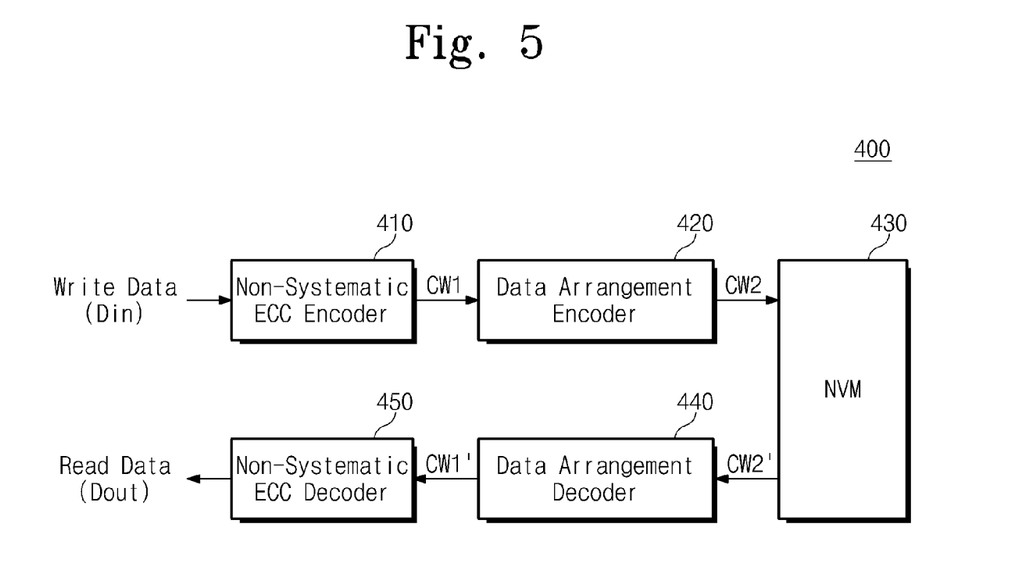
FIG. 5 is a block diagram illustrating a data processing procedure of a memory system using an error correction code (ECC) of a non-systematic coding scheme.

FIG. 5 is a block diagram of a memory system 400 including an ECC block of a non-systematic coding scheme. The non-systematic coding scheme means a data processing scheme that does not maintain the arrangement of input message data. That is, if an input message data matrix is [10101], a codeword processed by a non-systematic scheme does not maintain the arrangement of the message data matrix. Thus, if a non-systematic error correction operation is performed after data arrangement encoding, the effect of data arrangement encoding performed to prevent the interference between memory cells is not guaranteed. Thus, the operation sequence with respect to a data arrangement encoder/decoder must be fully considered in a system including a non-systematic ECC encoder/decoder.

Referring to FIG. 5, when write data Din is inputted, a non-systematic ECC encoder 410 performs an error correction operation on the write data Din. The non-systematic ECC encoder 410 outputs a first write codeword CW1 with parity bits through a non-systematic error correction operation.

A data arrangement encoder 420 receives the first write codeword CW1 and performs a data arrangement encoding operation. For example, the data arrangement encoding operation is performed according the RLL coding scheme described with reference to FIG. 3. By the data arrangement encoding operation, the first write codeword CW1 is outputted as a second write codeword CW2 with a changed data arrangement.

The second write codeword CW2 is programmed in a nonvolatile memory device 430. The second write codeword CW2 is data that is substantially removed of the condition that the erase state E0 and the program state P3 are adjacent to each other. Thus, the interference between memory cells can be prevented from occurring due to the lateral charge diffusion or the program disturbance, which has been described with reference to FIG. 1, even after a programming operation is performed on the nonvolatile memory device 430.

Upon receiving a read command from a host, the nonvolatile memory device 430 senses the memory cells programmed with the second write codeword CW2 to output a second read codeword CW2'. Thereafter, the second read codeword CW2' is outputted by a data arrangement decoder 440 and a non-systematic ECC decoder 450 as read data Dout.

The memory system 400 of FIG. 5 uses the non-systematic ECC that changes the message data arrangement. In this non-systematic ECC scheme, in a data write operation, an ECC encoding operation must be performed before a data arrangement encoding operation. Also, in a data read operation, a non-systematic ECC decoding operation must be performed after a data arrangement decoding operation.

Figure 6:
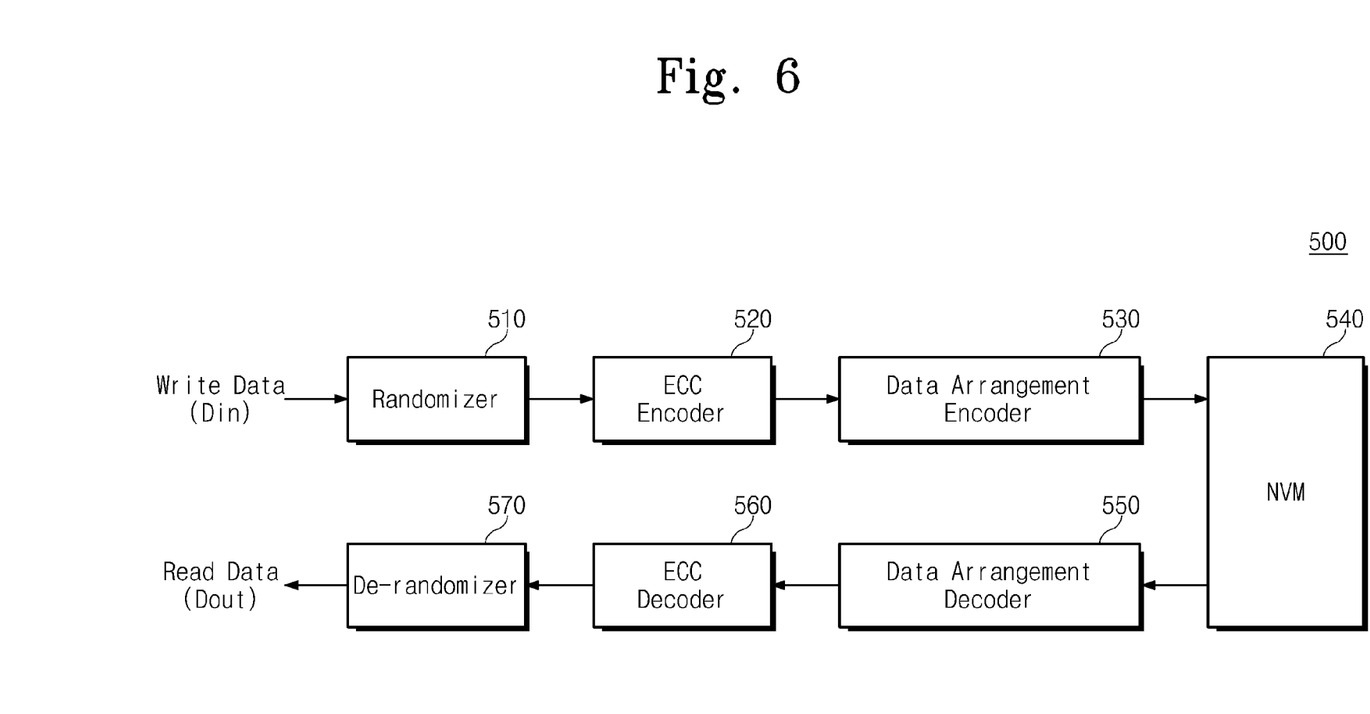
FIGS. 6 and 7 are block diagrams illustrating embodiments of a data processing procedure of the inventive concept including a randomizer.

FIG. 6 is a block diagram illustrating another embodiment of a data processing method according to the inventive concept. An embodiment of FIG. 6 may be regarded as a modification of the embodiment of FIG. 4B or 5. That is, FIG. 6 illustrates an embodiment that performs a data arrangement encoding operation last in a write operation and performs a data arrangement decoding operation first in a read operation. Specifically, the embodiment of FIG. 6 further includes operations by a randomizer 510 and a de-randomizer 570.

Referring to FIG. 6, when write data Din is inputted, a randomizer 510 reconfigures the write data Din. An ECC encoder 520 generates a parity for error detection/correction and adds the parity to the data outputted from the randomizer 510. Then, a data arrangement encoder 530 performs a data processing operation for reduction of inter-cell interference before a write operation is performed on a nonvolatile memory device 540. The data outputted from the data arrangement encoder 530 is programmed in a nonvolatile memory device 540. The output of read data Dout is performed through an inverse operation of the operation performed on the write data Din. The read data Dout is recovered by a data arrangement decoder 550 into the data arrangement before the performance of modulation encoding. The parity of the resulting data is removed by an error detection/correction operation of an ECC decoder 560. The resulting data is processed by a de-randomizer 570 and is outputted as the final read data Dout.

The embodiment of FIG. 6 may be applicable regardless of whether the ECC is systematic or non-systematic. Also, the locations of the randomizer 510/the de-randomizer 570 and the ECC encoder 520/the ECC decoder 560 are interchangeable. Also, although not illustrated in FIG. 6, an additional data processing unit (e.g., an interleaver/de-interleaver) may be further provided at the front end of the data arrangement encoder 530/the data arrangement decoder 550.

Figure 7:
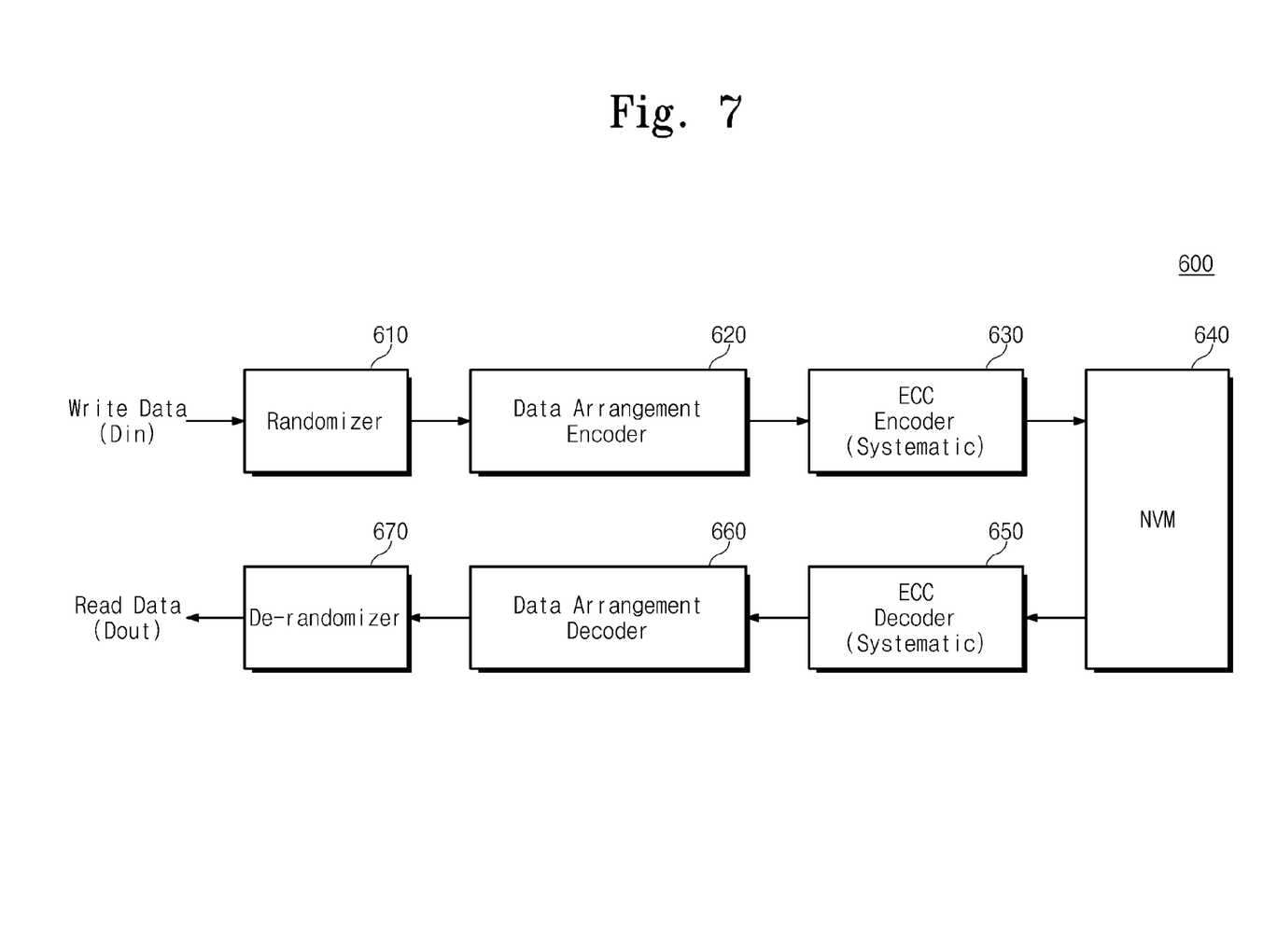

An embodiment of FIG. 7 may be regarded as a modification of the embodiment of FIG. 4A. That is, in a memory system 600 using a systematic ECC operation, a randomizer 610 is provided at the front end of a data arrangement encoder 620 while maintaining the operation sequence of "the data arrangement encoder 620 and a systematic ECC encoder 630". In a data write operation, even when a codeword processed by the data arrangement encoder 620 is reconfigured by the systematic ECC encoder 630, it does not affect the arrangement of message bits. Thus, the data arrangement for reduction of the interference between cells processed by the data arrangement encoder 620 can be maintained even at the output of the systematic ECC encoder 630.

A data read process from a nonvolatile memory device 640 is performed according to the inverse operations of the data write process. That is, data programmed into the arrangement for reduction of inter-cell interference is transferred from the nonvolatile memory device 640 to a systematic ECC decoder 650 in response to a write command. The systematic ECC decoder 650 performs an error detection/correction operation on the data outputted from the nonvolatile memory device 640, and outputs only message bits without parity bits to a data arrangement decoder 660. The data arrangement decoder 660 recovers the arrangement of the received message bits according to a corresponding decoding scheme. Then, a de-randomizer 670 processes the received data to output read data Dout.

Figure 8:
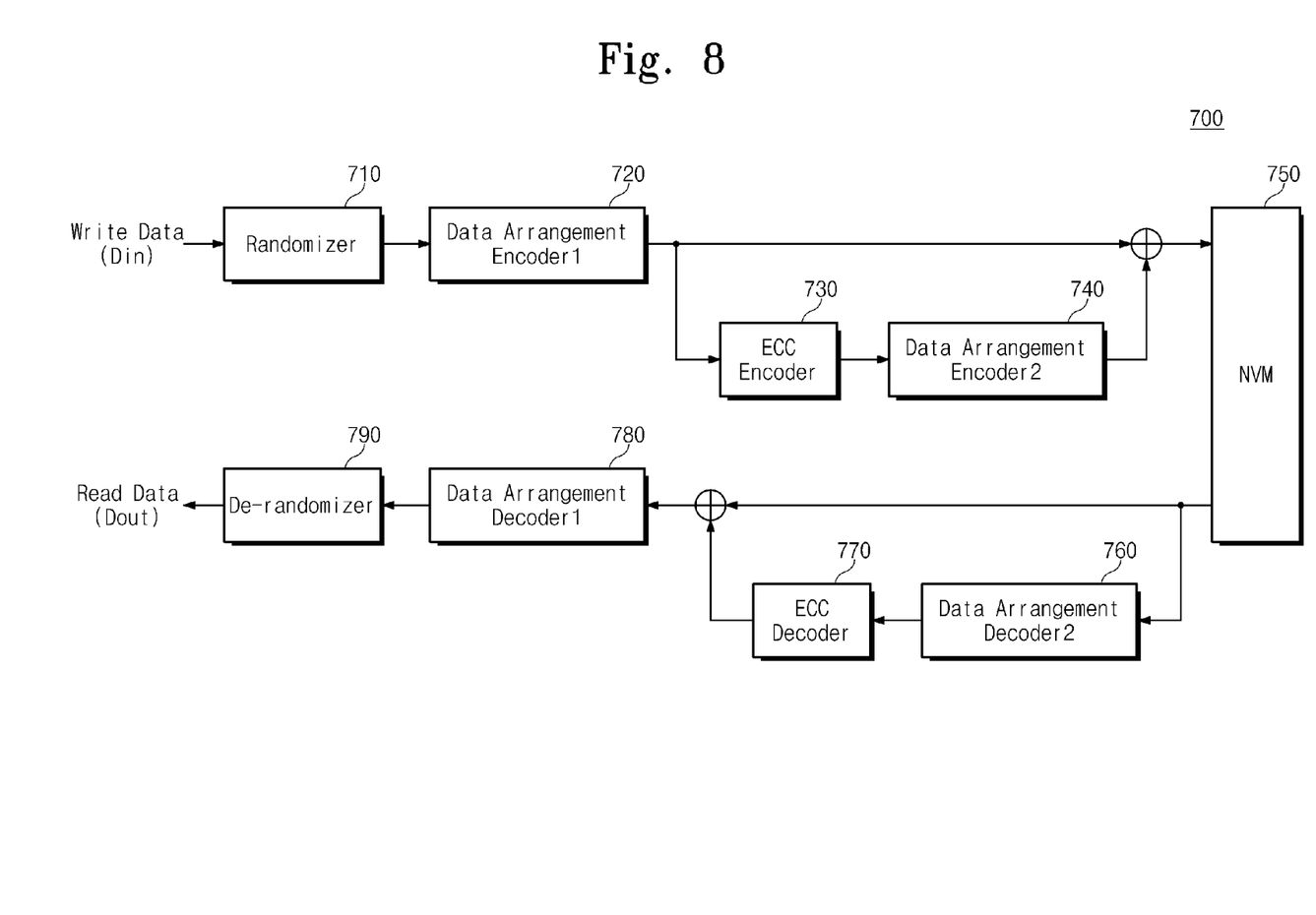
FIG. 8 is a block diagram illustrating a data processing procedure of a memory system including two data arrangement blocks.

FIG. 8 is a block diagram illustrating still another embodiment of the inventive concept. Specifically, FIG. 8 illustrates a data write/read process in a memory system 700 that performs a data arrangement operation two times.

Referring to FIG. 8, a randomizer 710 performs a randomizing operation on write data Din and transfers the resulting data to a first data arrangement encoder 720. The data outputted from the first data arrangement encoder 720 is transferred to an ECC encoder 730, so that a parity is added thereto through an ECC operation. Thereafter, a codeword with the parity is transferred to a second data arrangement encoder 740 to undergo a data processing operation for reduction of inter-cell interference. The data processed by the second data arrangement encoder 740 and the data processed by the first data arrangement encoder 720 are programmed in a nonvolatile memory device 750.

A data read process is performed according to the inverse operations of the data write process. That is, the data arrangement of data read from the nonvolatile memory device 750 is primarily converted by a second data arrangement decoder 760. Thereafter, an error is detected and corrected by an ECC decoder 770, and message bits with a parity are transferred to a first data arrangement decoder 780. The first data arrangement decoder 780 performs an additional decoding operation on the data outputted from the nonvolatile memory device 750 and the ECC decoder 770. Finally, the data processed by a de-randomizer 790 is outputted as read data Dout.

According to the above embodiment, it can be seen that the data arrangement encoders 720 and 740 must always be located at the front end of the nonvolatile memory device 750. Also, the data arrangement decoders 760 and 780 must be provided at the corresponding locations of the data arrangement encoders 720 and 740 to perform the inverse operations.

Figure 9A:
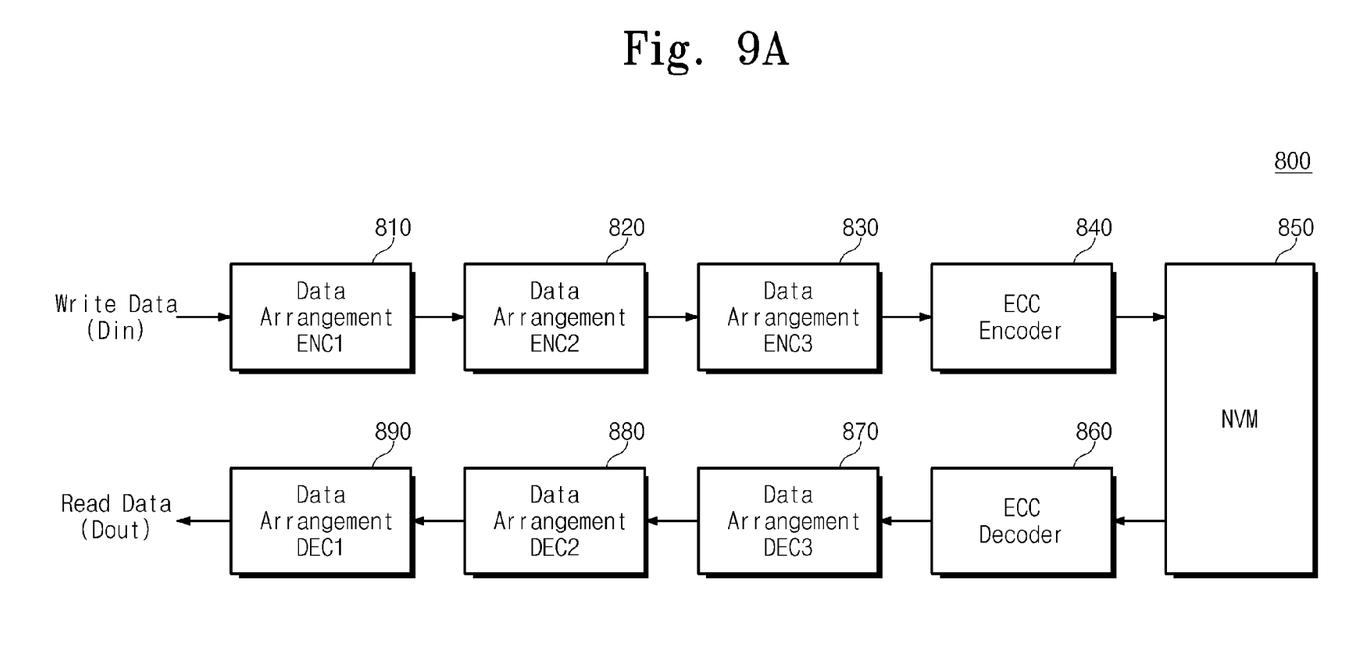
FIGS. 9A to 9C are block diagrams illustrating various embodiments of a data arrangement operation according to the inventive concept.
Figure 9B:
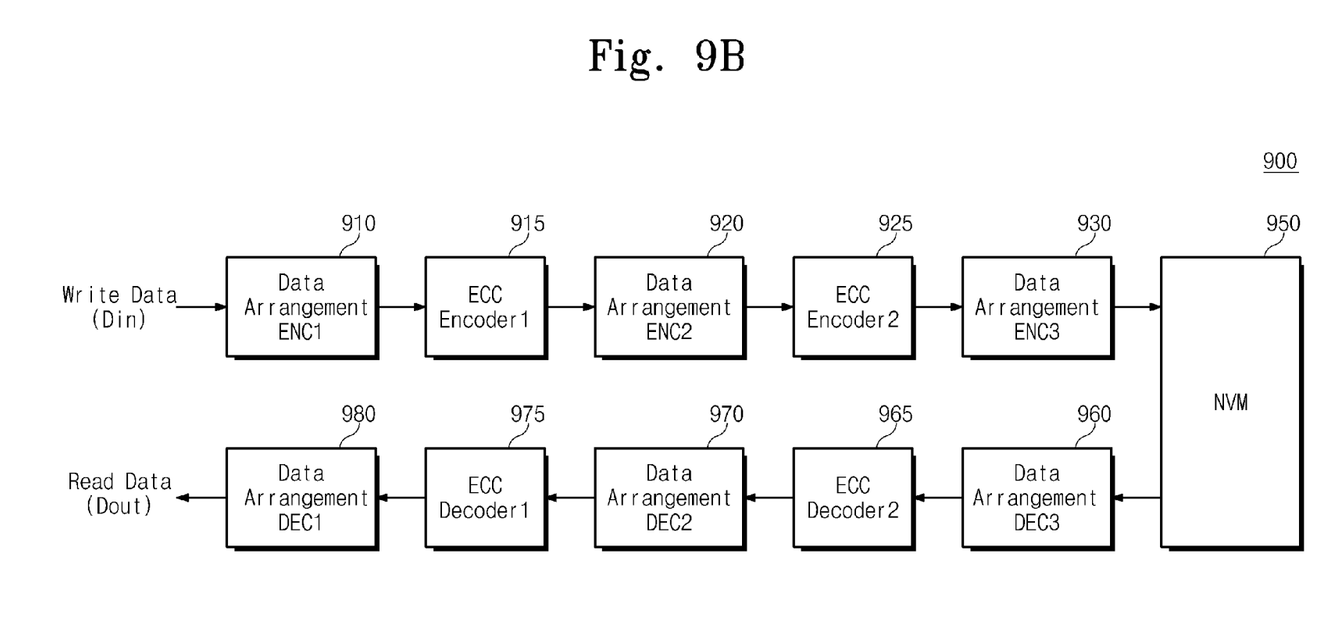
Figure 9C:
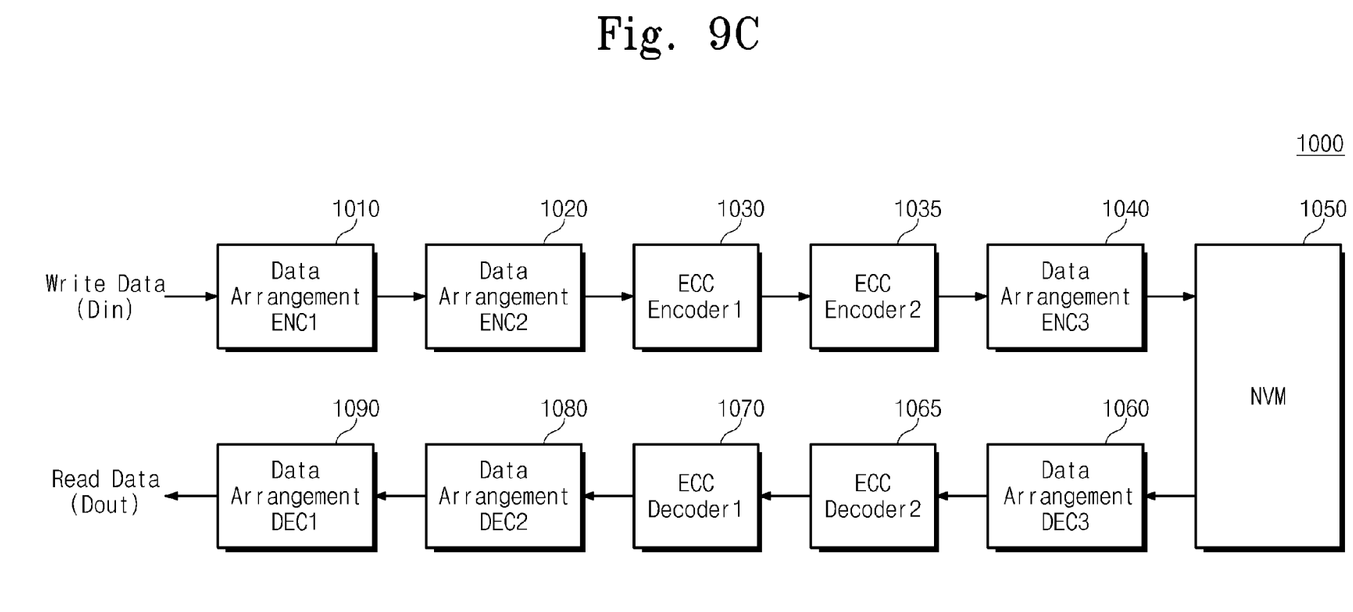

FIGS. 9A to 9C are block diagrams illustrating other embodiments of the inventive concept.

FIG. 9A illustrates an embodiment where a plurality of data arrangement encoders 810, 820 and 830 are located at the front end of an ECC encoder 840. A plurality of data arrangement decoders 870, 880 and 890 are located at the rear end of an ECC decoder 860. Herein, the data arrangement encoders 810, 820 and 830 and the data arrangement decoders 870, 880 and 890 may correspond respectively to data arrangement changing operation blocks such as a randomizer, an interleaver, and a modulation coding operation unit.

FIG. 9B illustrates a case where error correction operations are concatenately performed between the above data arrangement encoders/decoders (Concatenate ECC). ECC encoders 915 and 925 and ECC decoders 965 and 975 are located between data arrangement encoders 910, 920 and 930 and data arrangement decoders 960, 970 and 980, respectively.

FIG. 9C illustrates that the locations of concatenate ECC operations are variable. ECC encoders 1030 and 1035 and ECC decoders 1065 and 1070 are located between data arrangement encoders 1010, 1020 and 1040 and data arrangement decoders 1060, 1080 and 1090.

Although the data processing method for a nonvolatile memory device has been described above, the inventive concept is not limited thereto. The above data processing method may also be applicable to various systems.

Figure 10:
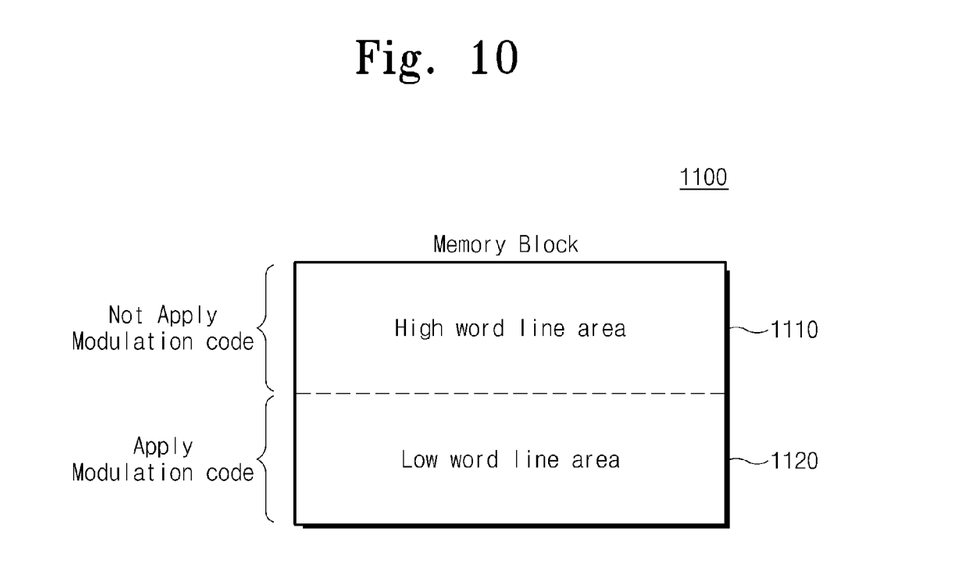
FIG. 10 is a block diagram illustrating a data processing method of a data arrangement scheme according to the location of a cell.

FIG. 10 is a block diagram illustrating another embodiment for increasing a coding rate when using the above data arrangement encoder/data arrangement decoder.

Referring to FIG. 10, it has been known that the influence of a program disturbance differs according to the program sequence and location in a nonvolatile memory device such as a flash memory device. Thus, a data arrangement operation may be applied selectively according to the location of a programmed memory cell.

The influence of a program disturbance is noticeable in a low word line area 1120 that is first programmed in a cell array 1100. Thus, the data arrangement encoder/decoder determines whether to perform a data arrangement operation, by detecting whether a program data write location corresponds to the low word line area 1120. If a row address inputted together with program data corresponds to a high word line area 1110, the data arrangement encoder/decoder does not perform a data arrangement encoding/decoding operation.

Figure 11:
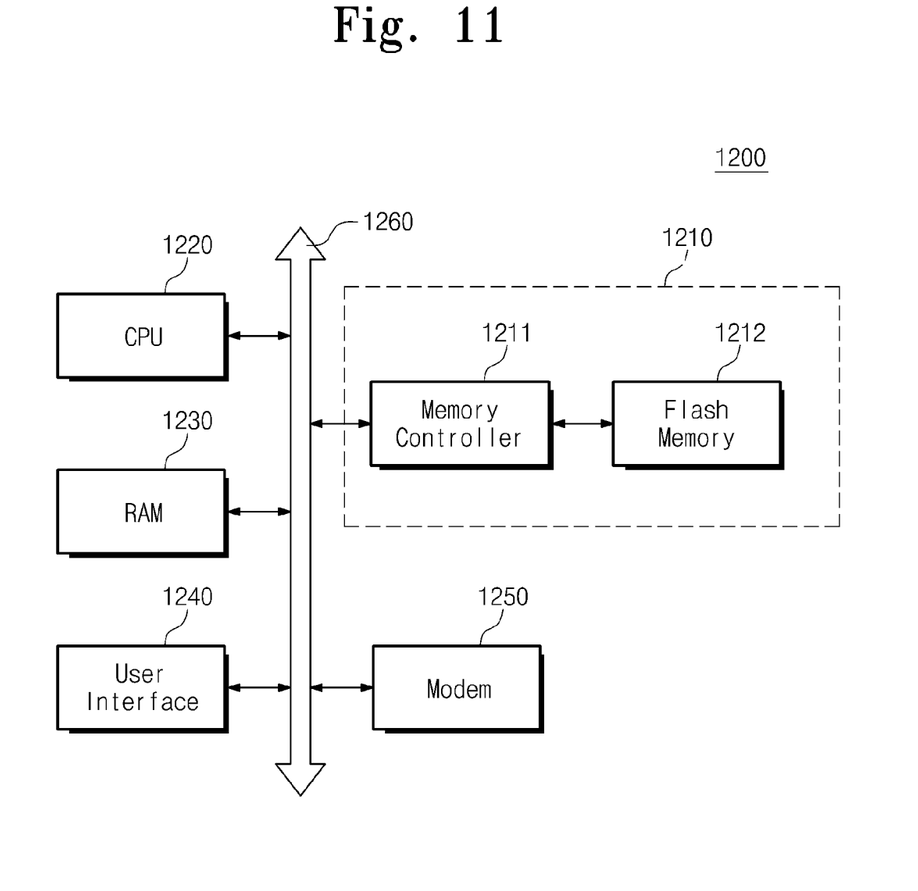
FIG. 11 is a block diagram of a computing system including a memory card that operates according to a data processing method of an embodiment of the inventive concept.

FIG. 11 is a block diagram of a computing system 1200 including a flash memory device 1212 according to the inventive concept.

Referring to FIG. 11, the computing system 1200 includes a microprocessor (e.g., CPU) 1220, a RAM 1230, a user interface 1240, a modem (e.g., baseband chipset) 1250, and a memory system 1210 that are electrically connected to a system bus 1260.

The memory system 1210 has substantially the same structure as the memory system 100 of FIG. 2. If the computing system 1200 is a mobile device, the computing system 1200 further includes a battery (not illustrated) for supplying an operation voltage of the computing system 1200. Although not illustrated in FIG. 11, those skilled in the art will readily understand that the computing system 1200 may further include an application chipset, a camera image processor (CIS), and a mobile DRAM. For example, the memory system 1210 may constitute a solid state drive/disk (SSD) that uses a nonvolatile memory to store data. Also, the memory system 1210 may be provided as a fusion flash memory (e.g., a one-NAND flash memory).

The flash memory device and/or the memory controller according to the inventive concept may be mounted in various types of packages. Examples of the packages of the flash memory device and/or the memory controller include Package on Package (PoP), Ball Grid Arrays (BGAs), Chip Scale Packages (CSPs), Plastic Leaded Chip Carrier (PLCC), Plastic Dual In-line Package (PDIP), Die in Waffle Pack, Die in Wafer Form, Chip On Board (COB), Ceramic Dual In-line Package (CERDIP), Plastic Metric Quad Flat Pack (MQFP), Thin Quad Flat Pack (TQFP), Small Outline Integrated Circuit (SOIC), Shrink Small Outline Package (SSOP), Thin Small Outline Package (TSOP), System In Package (SIP), Multi Chip Package (MCP), Wafer-level Fabricated Package (WFP), and Wafer-level Processed Stack Package (WSP).

According to the configuration and the data management method of the inventive concept, the data processing method affecting the data arrangement can be used in connection with an error correction code. Thus, it is possible to implement the data arrangement capable of reducing the error occurrence probability even when using an error correction code in a semiconductor memory device including a nonvolatile memory such as a flash memory. Accordingly, it is possible to increase the reliability of data stored in the memory device.

The above-disclosed subject matter is to be considered illustrative and not restrictive, and the appended claims are intended to cover all such modifications, enhancements, and other embodiments, which fall within the true spirit and scope of the inventive concept. Thus, to the maximum extent allowed by law, the scope of the inventive concept is to be determined by the broadest permissible interpretation of the following claims and their equivalents, and shall not be restricted or limited by the foregoing detailed description.

What is claimed is:

1. A semiconductor memory device comprising:
   a nonvolatile memory including a memory cell array of multi-level cells (MLCs), each MLC being configured to store data according to a plurality of data states including;
      an erase state indicated by a threshold voltage in a first threshold voltage distribution,
      a first program state indicated by a threshold voltage in a second threshold voltage distribution greater than the first threshold voltage distribution,
      a second program state indicated by a threshold voltage in a third threshold voltage distribution greater than the second threshold voltage distribution, and
      a third program state indicated by a threshold voltage in a fourth threshold voltage distribution greater than the third threshold voltage distribution; and
   a memory controller configured to perform a data rearrangement operation and an error correction code (ECC) operation for write data having an initial data arrangement and to be stored in the nonvolatile memory, wherein the data rearrangement operation rearranges the initial data arrangement to generate a new arrangement for the write data such that data in the write data having the erase state and data in the write data having the third program state are not stored in adjacent memory cells.

2. The semiconductor memory device of claim 1, wherein the ECC operation is performed according to a systematic ECC scheme that adds an error detection/correction parity to the write data and maintains an arrangement of message bits.

3. The semiconductor memory device of claim 1, wherein the ECC operation is performed according to a non-systematic ECC scheme that adds an error detection/correction parity to the write data and changes an arrangement of message bits.

4. The semiconductor memory device of claim 3, wherein the memory controller performs the ECC operation before the data rearrangement operation.

5. The semiconductor memory device of claim 1, wherein the data rearrangement operation reconfigures the initial arrangement of the write data using at least one of a run-length limited (RLL) code, a randomizing operation, and an interleaving operation.

6. The semiconductor memory device of claim 1, wherein the memory controller is further configured to perform a data read operation during which the memory controller detects/corrects an error in read data obtained from the nonvolatile memory using the ECC operation and to recover the initial arrangement for the read data according to the data rearrangement operation.

7. The semiconductor memory device of claim 1, wherein the data rearrangement operation is applied only to some of the MLCs in the memory cell array.

8. The semiconductor memory device of claim 1, wherein each MLC is configured to store two (2) data bits.

9. The semiconductor memory device of claim 1, wherein the memory controller is further configured to randomization operation on the write date.

10. The semiconductor memory device of claim 9, wherein the randomization operation is performed on the write data before the ECC operation, and the ECC operation is performed on the write data before the data rearrangement operation.

11. The semiconductor memory device of claim 9, wherein the memory controller is further configured to perform a data read operation by obtaining read data from the nonvolatile memory, detecting and correcting an error in the read data using the ECC operation, recovering the initial arrangement for the read data using the data rearrangement operation, and then de-randomizing the read data.

12. A semiconductor memory device comprising:
a nonvolatile memory having a plurality of memory cells, the memory cells are multi-level cells that store data as program states of different respective threshold voltages; and
a memory controller performing a data rearrangement operation and an error correction code (ECC) operation to reduce interference between the memory cells,
the data rearrangement operation rearranges the data to be stored in the nonvolatile memory so that data corresponding to an erase program state and data corresponding to a program state with a highest threshold voltage from among the different respective threshold voltages are not stored in adjacent memory cells.

13. The semiconductor memory device of claim 12, wherein the ECC operation is performed according to a systematic ECC scheme that adds an error detection/correction parity to the data and maintains an arrangement of message bits.

14. The semiconductor memory device of claim 12, wherein the ECC operation is performed according to a non-systematic ECC scheme that adds an error detection/correction parity to the data and changes an arrangement of message bits.

15. The semiconductor memory device of claim 12, wherein the memory controller performs the ECC operation before the data rearrangement operation.

16. The semiconductor memory device of claim 12, wherein the data rearrangement operation reconfigures an arrangement of the data by at least one of a run-length limited (RLL) code, a randomizing operation, and an interleaving operation.

17. The semiconductor memory device of claim 12, wherein in a data read operation, the memory controller detects/corrects an error in read data provided from the nonvolatile memory according to the ECC operation and recovers an arrangement of the read data according to the data rearrangement operation.

18. The semiconductor memory device of claim 12, wherein the data rearrangement operation is applied only to some of the memory cells.

* * * * *